United States Patent Office 2,970,641
Patented Feb. 7, 1961

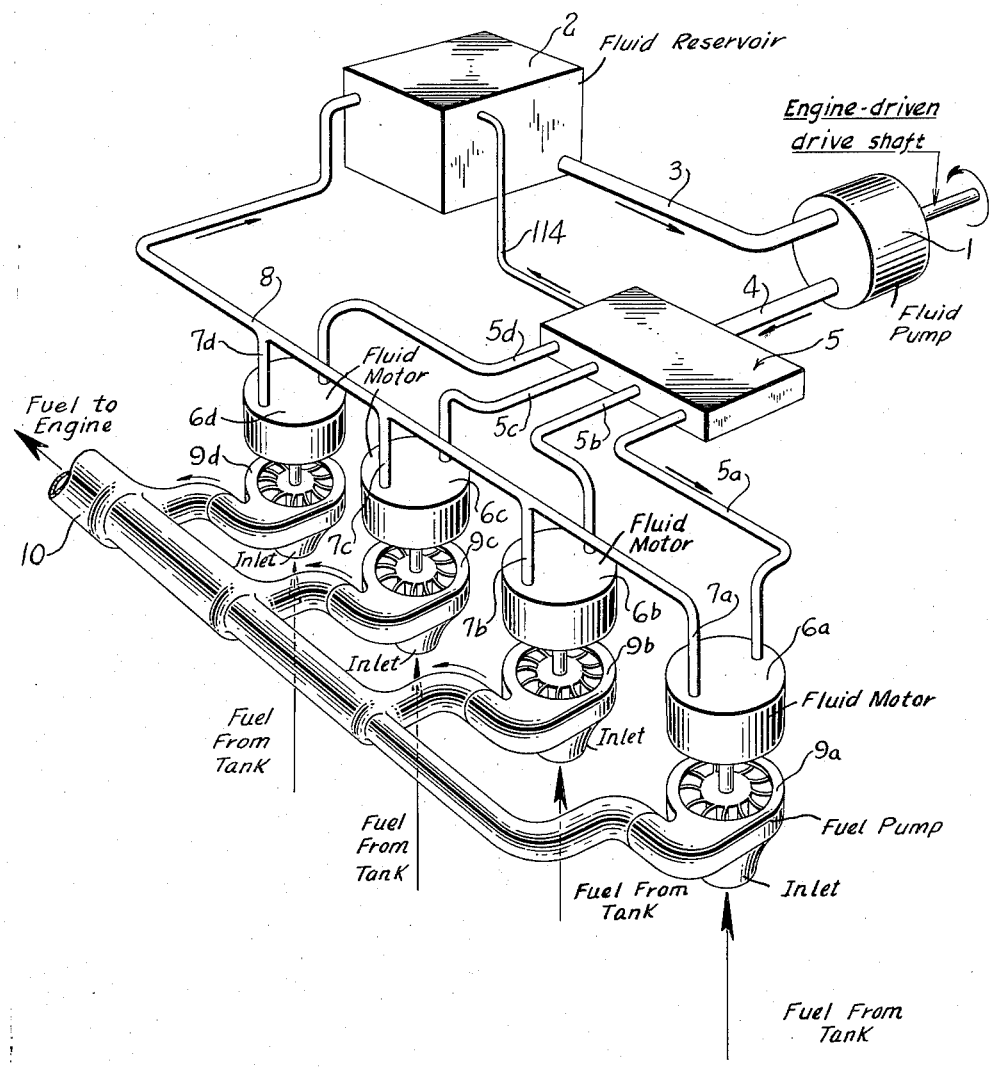

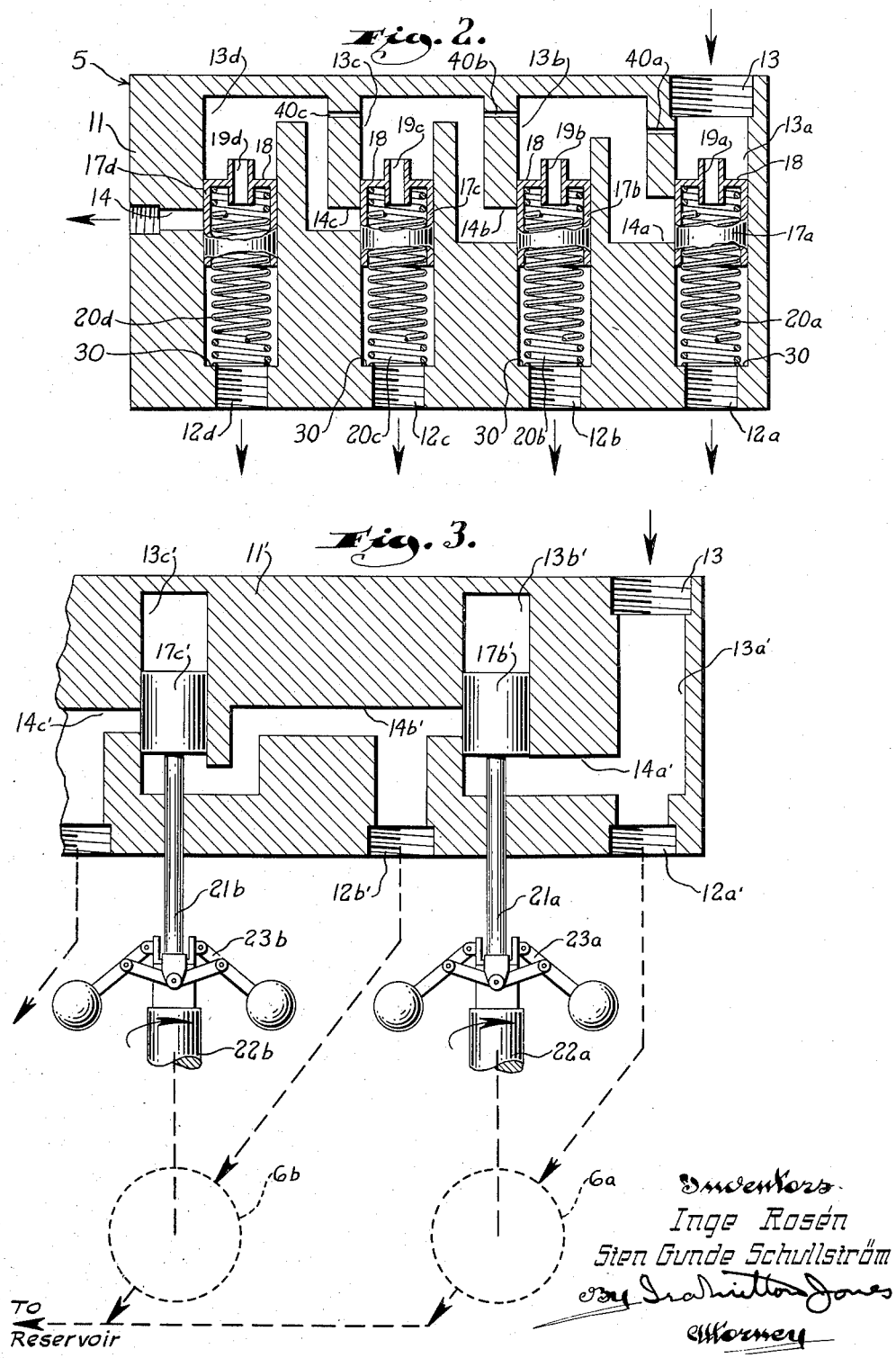

2,970,641

APPARATUS FOR PUMPING FUEL AT VARYING RATES

Inge Rosen and Sten Gunde Schullstrom, Linkoping, Sweden, assignors to Svenska Aeroplan Aktiebolaget, Linkoping, Sweden, a corporation of Sweden Filed Aug. 1, 1956, Ser. No. 601,525

8 Claims. (Cl. 158—36.4)

This invention relates to fuel pumps for aircraft and the like, and refers more particularly to apparatus for efficiently pumping fuel from a source thereof to an engine at a rate substantially proportional to the speed of the engine.

It will be appreciated that while the apparatus described herein has particular utility for pumping liquid fuel to the internal combustion engine of an aircraft, it is in no wise restricted to such applications, but has general utility for pumping any fluid from a source thereof to another place at a rate substantially proportional to the speed of a drive mechanism.

Fuel pumps used in aircraft fuel systems, and particularly such pumps as those of the impeller type, have an optimum speed range in which they function most efficiently. If such a pump is operated outside its optimum speed range, and especially if it is operated above that range, its power consumption becomes excessive in proportion to the amount of fuel which it pumps, and conceivably, in extreme cases, the actual pumping rate may be below that which obtains within the optimum speed range of the pump, despite greatly increased power consumption.

It is therefore an object of this invention to provide appartus for pumping fuel or the like wherein the rate at which fuel is being pumped is always substantially proportional to the speed of a drive mechanism for the apparatus, and wherein, moreover, the power required by the apparatus is at all times substantially proportional to the rate at which it pumps fuel, so that the apparatus is highly efficient.

Another object of this invention resides in the provision of apparatus for pumping fuel or the like wherein a plurality of fuel pumps, connected in parallel between a fuel tank or other liquid source and a point of utilization of the liquid, are individually driven by hydraulic motors, and wherein a hydraulic pump connected with a mechanical drive means is so connected with the hydraulic motors that the number of motors in operation at any given time is substantially proportional to the speed at which the hydraulic pump is driven, and each motor is at all times operated within the optimum speed range of the pump that it drives.

A further object of this invention resides in the provision of fuel pumping apparatus for aircraft or the like wherein a plurality of fuel pumps are arranged in parallel between a fuel source and an engine to which fuel is to be supplied, and wherein an automatic distributing valve controls the flow of hydraulic fluid from a hydraulic pump driven by the engine to a hydraulic motor connected with each fuel pump in such a manner that the number of hydraulic motors in operation is substantially proportional to the fuel requirements of the engine and each of the fuel pumps is at all times driven within its optimum speed range.

Thus, in general, it is the purpose of this invention to provide an efficient and dependable fuel system for aircraft and the like whereby the fuel delivered to the engine will at all times be properly proportioned to its fuel requirements and the fuel pumping apparatus at all times operates with the minimum amount of power required to satisfy the existing fuel demand.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate several complete examples of the physical embodiments of the invention constructed according to the best modes so far devised for the practical application of the principles thereof, and in which:

Figure 1 is a more or less diagrammatic perspective view showing the invention embodied in an aircraft fuel system;

Figure 2 is a longitudinal sectional view of the distributing valve mechanism shown diagrammatically in Figure 1; and Figure 3 is a fragmentary longitudinal sectional view of a modified embodiment of the distributing valve mechanism.

Referring now to the accompanying drawings, the numeral 1 designates generally a hydraulic pump which may be drivingly connected with an internal combustion engine or other drive mechanism represented by the legend "Engine driven drive shaft," and which pump is adapted to draw hydraulic fluid from a reservoir 2 through a duct 3 and to force such hydraulic fluid under pressure through a duct 4 communicating the hydraulic pump with a distributing valve designated generally by the numeral 5.

The distributing valve 5 communicates the hydraulic pump with one or more of a number of hydraulic motors 6a, 6b, 6c, 6d, each of which is drivingly connected with a fuel pump, the pumps connected with the several motors being respectively designated 9a, 9b, 9c, 9d. The fuel pumps are submerged in the fuel in a fuel tank (not shown) and deliver fuel therefrom to a common delivery conduit 10.

The distributing valve 5 communicates the outlet 4 of the hydraulic duct with the several hydraulic motors in such a manner that hydraulic fluid from the pump is sent to one or more of the motors at a rate such that each motor connected with the hydraulic pump is always operating within the optimum speed range of its associated fuel pump, and the number of hydraulic motors in operation at any given time is substantially proportional to the rate at which the hydraulic pump is pumping hydraulic fluid, or, in orther words, to the speed at which the hydraulic pump is driven. Hydraulic fluid flows from the distributing valve to the respective hydraulic motors through inlet ducts 5a, 5b, 5c, 5d; and outlet ducts 7a, 7b, 7c, and 7d communicate the respective hydraulic motors with a return duct 8 by which hydraulic fluid returns to the reservoir 2.

The construction of the distributing valve mechanism is shown in Figure 2, wherein the numeral 11 designates a body having a number of bores 13a, 13b, 13c, 13d therein, the number of bores corresponding to the number of fuel pumps—four in the present case. All of the bores open to the exterior of the body through axially located outlets 12a, 12b, 12c, 12d, these outlets being suitably threaded or otherwise adapted to be connected to the respective ducts 5a, 5b, 5c and 5d which connect the distributing valve with the several hydraulic motors. One of the bores extends entirely through the body to provide at its opposite end an inlet 13 connectable with the duct 4 by which the distributing valve is at all times communicated with the discharge side of the hydraulic pump.

Intermediate its ends the bore 13a has a laterally disposed outlet defined by a passage 14a in the body, which passage communicates bore 13a with the end of the bore 13b remote from the outlet 12b thereof. Similarly, a lateral passage 14b in the valve body communicates the bore 13b with the bore 13c, and another lateral passage 14c communicates the bore 13c with the bore 13d, the lateral passage 14b having a smaller cross-sectional area than passage 14a, and the passage 14c being smaller still in cross-section. Intermediate the ends of bore 13d there is also an outlet 14, but this leads to the exterior of the body and is threaded to provide for connection with a duct 114 which communicates it with the hydraulic fluid reservoir 2, so that the outlet 14 may provide for pressure relief, as brought out hereinafter.

The bores 13a, 13b, 13c and 13d have piston-like slide valves 17a, 17b, 17c, 17d, respectively, operable therein to control communication between their axially disposed inlets and their lateral outlets 14a, 14b, 14c and 14d; and coiled compression springs 20a, 20b, 20c, 20d, respectively bias the slide valves to their closed positions, the springs being confined between the underside of the slide valves and inwardly facing shoulders 30 at the discharge or outlet ends of the bores. Preferably, the slide valves are cup shaped to reduce the weight thereof and provide pockets for their springs, and each of the slide valves has an axial bore through its end wall 18 to provide flow metering ports or orifices 19a, 19b, 19c, 19d.

It will be seen that hydraulic fluid from the hydraulic pump entering the bore 13a through the inlet 13 will flow through the metering port 19a to the hydraulic motor 6a, so that said motor will always be communicated with the hydraulic pump. As long as the rate of flow of hydraulic fluid from the pump remains within values such that the hydraulic motor 6a drives its fuel pump 9a within the optimum speed range of the latter, the slide valve 17a will block the lateral outlet passage 14a leading from the bore 13a and prevent flow of hydraulic fluid to the other bores, and hence to the other hydraulic motors.

When the speed of the hydraulic pump increases, its output also increases, with the result that an increase in pressure differential is manifested across the ported valve element 17a. Upon attainment of a predetermined increase in this hydraulic fluid pressure differential the slide valve 17a is thereby moved against the bias of its spring 20a to a position uncovering the lateral passage 14a. This permits hydraulic fluid from the pump to flow into bore 13b and thence, through flow metering port 19b, to hydraulic motor 6b. Obviously, a further increase in hydraulic pump speed will be manifested in a further increase in hydraulic fluid rate of flow resulting in increased impact pressure upon valve 17b whereby it is moved against the bias of its spring 20b and uncovers passage 14b. Hydraulic fluid then flows to bore 13c and thence, through metering port 19c, to motor 9c; and a still further increase in hydraulic pump speed or output will similarly bring motor 6d into operation.

If all of the motors are in operation and hydraulic fluid flow rate further increases, the resultant displacement of slide valve 17d uncovers the relief outlet 14, permitting excess hydraulic fluid to return to the reservoir.

When the speed, and hence the output, of the hydraulic pump decreases, the slide valves will, each in turn, move to their normal positions blocking the lateral outlets from the bores, the sequence, of course, being the reverse of that described above, so that each hydraulic motor will continue to operate at a speed corresponding to the optimum range of its fuel pump and the number of hydraulic motors in operation will be decreased substantially in proportion to the decrease in hydraulic pump speed.

The distributing valve just described responds indirectly to changes in speed of the hydraulic pump as manifested in variations in the rate of flow of hydraulic fluid flowing to the hydraulic motor or motors driven thereby. The modified distributing valve shown in Figure 3 responds directly to hydraulic motor speeds, and thus also responds to a manifestation or function of rate of flow of the hydraulic fluid. In this embodiment, too, the distributing valve serves to direct hydraulic fluid from the pump to such a number of the motors as will maintain each of them operating within the optimum speed range of its fuel pump, and the number of motors in oepration at any given time will be substantially proportional to the rate at which hydraulic fluid is pumped by the hydraulic pump.

More specifically, the distributing valve shown in Figure 3 comprises a body 11' having therein a plurality of bores 13a', 13b', 13c' etc. In this instance the bore 13a' has its inlet 13 at one side of the body unrestrictedly communicated with its outlet 12a' at the other side of the body, so that hydraulic fluid from the pump may at all times flow unrestrictedly to the hydraulic motor 6a. Leading directly from the bore 13a' is a lateral passage 14a' which opens to one end of the adjacent bore 13b'; and a lateral passage 14b' opens from the bore 13b', intermediate the ends thereof, to one end of the next adjacent bore 13c' and also to an outlet 12b' which communicates with the hydraulic motor 6b. Similarly, a lateral passage 14c' communicates the bore 13c' with the next adjacent bore and with another hydraulic motor, and so on. In each of the bores 13b', 13c' etc. is a slide valve 17b', 17c', etc. which normally obstructs communication between the inlet at the end of the bore and the lateral outlet intermediate its ends. Each slide valve is actuated by means of a centrifugally responsive flyweight mechanism 23a, 23b, etc., of a well known type, driven by the rotator 22a, 22b, etc. of the respective hydraulic motor. Outward centrifugally responsive motion of the flyballs is translated into axial motion of the associated slide valve out of its normal position by means including a push rod 21a, 21b, etc., connected between each flyweight mechanism 23a, 23b, etc. and its associated slide valve.

As hydraulic fluid flow rate at the hydraulic motor 6a rises above a predetermined value, the flyweight mechanism 23a driven thereby will actuate the slide valve 17b' out of its normal position, thus admitting hydraulic fluid to the motor 6b via the passage 14b' and outlet 12b'. Similarly, as further increase in hydraulic fluid flow is manifested in an increase in the speed of hydraulic motor 6b, the passage 14c' will be uncovered and another motor will be put into operation, and so on. Obviously, the operation will be reversed as rate of flow of the hydraulic fluid decreases with decreasing speed of the hydraulic pump.

If desired, all of the motors may be operated at a low idling speed at times when they are not required for pumping operation, in order to effect smoother starting of them when they are brought into operation by reason of the fact that the initial friction is already overcome. Those skilled in the art will recognize that this may be readily accomplished by means of highly restricted orifices 40a, 40b and 40c in the valve body, at all times providing a direct communication between the hydraulic pump and all of the motors, or, if desired, simply by means of controlled leakage past the slide valves.

From the foregoing description taken together with the accompanying drawings, it will be apparent that this invention provides apparatus for pumping fuel to an aircraft engine at a rate substantially proportional to the speed of the engine, and hence to the fuel requirements of the engine, wherein a plurality of fuel pumps are employed, all connected in parallel between the fuel source and the engine and each of which is at all times operated within its optimum speed range, the number of pumps in operation at any given time being substantially proportional to the fuel requirements of the engine at that time, so that a minimum amount of power is required to effect such pumping of fuel.

What is claimed as our invention is:

1. In a fuel supply system for an engine which operates at widely varying speeds and to which fuel must be supplied at substantially constant pressure and at a rate substantially proportional to the speed of engine rotation: a plurality of centrifugal pumps connected in parallel between a source of fuel and a common fuel inlet for the engine, said pumps being individually incapable of supplying the entire fuel requirement for the engine at its maximum operating speed but together being capable of providing said fuel requirement without exceeding the optimum operating range of any of the pumps; a plurality of hydraulic motors, each drivingly connected with one of said pumps; a variable delivery hydraulic pump drivingly connected with the engine for pumping hydraulic fluid at a rate substantially proportional to the speed of the engine; means at all times connecting the hydraulic pump with one of the hydraulic motors; and automatic distributor means connected with all of the hydraulic motors and with the hydraulic pump and responsive to a function of the rate of flow of hydraulic fluid to said one hydraulic motor to connect another hydraulic motor with the hydraulic pump when said rate of flow of hydraulic fluid exceeds a value at which the pump driven by said one hydraulic motor approaches the upper limit of its operating range, and to disconnect said other hydraulic motor from the hydraulic pump when said rate of flow decreases to substantially said value, so that each motor drives its pump within the optimum speed range of the latter, and so that the number of pumps in operation is at all times substantially proportional to the speed of the engine.

2. Apparatus, driven by an output shaft of an engine which rotates at widely varying speeds, for efficiently pumping fuel from a source thereof to the engine at substantially the rate at which fuel is required by the engine, and with substantially constant pressure, said apparatus comprising: a variable delivery hydraulic pump having its inlet connected with a source of hydraulic fluid; means drivingly connecting the variable delivery pump with the engine output shaft so that the rate of flow of hydraulic fluid out of the pump varies in proportion to the speed at which the engine operates; a plurality of centrifugal pumps each having its inlet connected with said source of fuel, and its outlet connected with a common fuel feeding duct; a plurality of hydraulic motors, each drivingly connected with one of said centrifugal pumps and the speed of each of which is determined by the rate at which hydraulic fluid flows therethrough; and distributor valve means connected between the outlet of the hydraulic pump and said hydraulic motors, said distributor valve means including means for at all times connecting one of said hydraulic motors with the hydraulic pump, and other means responsive to a function of the rate of flow of hydraulic fluid through said one hydraulic motor for connecting another hydraulic motor with the hydraulic pump when the rate of flow of hydraulic fluid through said one hydraulic motor exceeds a predetermined value, to thus maintain the number of centrifugal pumps in operation at any one time substantially proportional to engine speed.

3. Apparatus for efficiently pumping fuel or the like at widely varying rates proportional to varying speeds of rotation of a drive mechanism, said apparatus comprising: a plurality of pumps, each having a small range of optimum pumping rates, and all connected in parallel between a source of fluid to be pumped and a manifold into which fluid is to be pumped from said source; a plurality of hydraulic motors, each drivingly connected with one of said pumps; a variable output hydraulic pump drivingly connected with said drive mechanism and adapted to pump hydraulic fluid from a source thereof at rates proportional to the speed of rotation of the drive mechanism; and means for supplying fluid from the hydraulic pump to said hydraulic motors and for limiting the speed at which said motors are driven to a predetermined value corresponding to the optimum pumping rates of the pumps driven thereby, said means comprising valve means responsive to a function of the rate of flow of hydraulic fluid from the hydraulic pump to one hydraulic motor to connect another hydraulic motor with the hydraulic pump when the speed of said one motor reaches said predetermined value.

4. In a fuel supply system for an engine which operates over a wide range of speeds: a plurality of centrifugal fuel pumps connected in parallel between a source of fuel and a common fuel inlet for the engine, each of said pumps, when operating at efficient pumping speeds, being capable of supplying only its proportionate share of the fuel needs of the engine when the latter is operating at maximum speed; means drivingly connected with the engine for producing an output which varies in proportion to engine speed; individual output operated pump driving means for each pump; means for at all times supplying engine produced output to one of said pump driving means whereby the latter tends to operate at a speed proportional to the rate at which output is produced by the engine; and means for supplying engine produced output to another pump driving means and for assuring operation of the pump driven by said one pump driving means at efficient pumping speeds regardless of the rate at which output is produced by the engine, said last named means comprising control means, responsive to a function of the rate at which output is supplied to said one pump driving means, for effecting diversion of output to said other pump driving means at times when the rate of output supplied to said one pump driving means approaches a value substantially corresponding to maximum efficient pumping speed, so that said other pump driving means is automatically rendered operative and inoperative upon predetermined increases and decreases, respectively, in the rate at which output is produced by the engine.

5. The fuel supply system of claim 4, further characterized by the provision of other control means, responsive to a function of the rate at which diverted output is supplied to said other pump driving means for effecting further diversion of engine produced output when the rate of output supplied to said other pump driving means approaches a value substantially corresponding to maximum efficient pumping speed.

6. In a fuel supply system for an engine which operates over a wide range of speeds: a plurality of centrifugal fuel pumps connected in parallel between a source of fuel and a common fuel inlet for the engine, each of said pumps, when operating at efficient pumping speeds, being capable of supplying only its proportionate share of the fuel needs of the engine when the latter is operating at maximum speed; means drivingly connected with the engine for producing an output which varies in proportion to engine speed; individual output operated pump driving means for each pump; means for at all times supplying engine produced output to one of said pump driving means whereby the latter tends to operate at a speed proportional to the rate at which output is produced by the engine; and means for supplying engine produced output to another pump driving means and for assuring operation of the pump driven by said one pump driving means at efficient pumping speeds, regardless of the rate at which output is produced by the engine, said last named means comprising control means, responsive to a function of the rate at which output is supplied to said one pump driving means, for effecting diversion of output to said other pump driving means in amounts which vary in proportion to the rate at which output is supplied to said one pump driving means at times when said rate of output approaches a value substantially corresponding to maximum efficient pumping speed, and which further varies with further increasing engine output when said one pump driving means attains its maximum efficient pumping speed.

7. In a fluid flow control system of the character described: a drive shaft which rotates at widely varying speeds; a variable output fluid pump drivingly connected with said shaft for pumping fluid at a rate substantially proportional to the speed of rotation of the drive shaft; a plurality of fluid motors; means for at all times conducting output fluid from the pump to one of said motors whereby said one motor tends to operate at a speed proportional to the speed of rotation of the drive shaft and to the rate at which output fluid issues from the pump; and control means for conducting output fluid from the pump to another motor and for maintaining motor operation within a predetermined range of speeds substantially narrower than the range of speeds of the drive shaft, said control means comprising valve means responsive to a function of the rate at which fluid flows to said one motor for effecting diversion of fluid to said other motor at times when the rate of output fluid conducted to said one motor approaches a value substantially corresponding to the maximum of said predetermined range of motor speeds, so that said other motor is automatically rendered operative and inoperative upon predetermined increases and decreases, respectively, in the speed at which the drive shaft operates, whereby said other motor also tends to operate at a speed proportional to the speed of rotation of the drive shaft and to the rate at which output fluid issues from the pump, and other valve means responsive to a function of the rate at which fluid flows to said other motor for effecting further diversion of output fluid when the rate of output fluid conducted to said other motor approaches a value substantially corresponding to the maximum of said predetermined range of speeds of said other motor.

8. The fluid control system of claim 7, further characterized by the provision of means for at all times conducting a limited amount of output fluid to said other motor to maintain the same in operation at a slow idling speed.

References Cited in the file of this patent
UNITED STATES PATENTS

| | | |
|---|---|---|
| 1,972,812 | Woolley | Sept. 4, 1934 |
| 2,333,075 | Roe | Oct. 26, 1943 |
| 2,374,588 | Doran | Apr. 24, 1945 |
| 2,398,265 | Tyler | Apr. 9, 1946 |
| 2,500,627 | Chinn | Mar. 14, 1950 |
| 2,526,646 | Ericson | Oct. 24, 1950 |
| 2,549,989 | Simonds | Apr. 24, 1951 |
| 2,609,868 | Carey | Sept. 9, 1952 |
| 2,676,603 | Kollsman | Apr. 27, 1954 |
| 2,750,953 | Helsey et al. | June 19, 1956 |